(12) United States Patent
Pearson et al.

(10) Patent No.: US 6,292,499 B1
(45) Date of Patent: Sep. 18, 2001

(54) SOLDERABLE OPTICAL MOUNT

(75) Inventors: Leonard P. Pearson, Bellevue; David C. Shannon, Woodinville; Diane E. Smith, Seattle; Larry B. Kulesa, Bothell, all of WA (US)

(73) Assignee: Aculight Corporation, Bothell, WA (US)

( * ) Notice: Subject to any disclaimer, the term of this patent is extended or adjusted under 35 U.S.C. 154(b) by 0 days.

(21) Appl. No.: 09/112,581

(22) Filed: Jul. 9, 1998

Related U.S. Application Data

(63) Continuation-in-part of application No. 09/097,648, filed on Jun. 16, 1998, now Pat. No. 6,172,997.

(51) Int. Cl.[7] .............................. H01S 3/04; H01S 3/08; H01S 3/00

(52) U.S. Cl. ........................ 372/36; 372/107; 372/109

(58) Field of Search ................................. 359/896, 831, 359/819, 820; 248/246.03; 372/36, 109, 50, 107; 385/14, 89, 91; 361/700; 174/260

(56) References Cited

U.S. PATENT DOCUMENTS

| | | | |
|---|---|---|---|
| 4,079,404 | 3/1978 | Comerford et al. | 372/50 |
| 4,635,093 | * 1/1987 | Ross | 174/260 |
| 4,731,795 | 3/1988 | Clark et al. | 372/107 |
| 4,749,842 | 6/1988 | Kane et al. | 219/201 |
| 4,752,109 | 6/1988 | Gordon et al. | 385/14 |
| 4,807,956 | 2/1989 | Tournereau et al. | 385/91 |
| 4,904,036 | 2/1990 | Blonder | 385/14 |
| 4,944,569 | 7/1990 | Boudreau et al. | 385/95 |
| 4,989,935 | 2/1991 | Stein | 250/551 |
| 5,062,117 | 10/1991 | Anthon et al. | 372/75 |
| 5,077,878 | 1/1992 | Armiento et al. | 29/25.02 |
| 5,150,376 | 9/1992 | Ohmori et al. | 372/22 |
| 5,170,409 | 12/1992 | Nightingale et al. | 372/107 |
| 5,265,113 | 11/1993 | Halldorsson et al. | 372/36 |

(List continued on next page.)

FOREIGN PATENT DOCUMENTS 40 41 130 A1   7/1992 (DE) .

Primary Examiner—Quyen Leung
(74) Attorney, Agent, or Firm—McCutchen, Doyle, Brown & Enersen LLP; David G. Beck

(57) ABSTRACT

A method and apparatus for mounting components to an optical bench is provided. The mount allows the components to be easily detached, realigned, and remounted at will. Components that can use the mount include, but are not limited to, mirrors, output couplers, windows, filters, lenses, optical fibers, nonlinear crystals, active and passive Q-switches, piezoelectric elements, apertures, laser gain media, and detectors. The optical component is mounted to an upright portion of the optical mount, the upright portion being mounted to a base plate. The base plate includes a heater, such as a resistive heater, that is used to solder the base plate to the optical bench. Preferably the heater is electrically coupled to a pair of contacts located on the upright portion of the mount, thus providing an easy method of coupling a power source to the heater. To reposition the mount once it has been soldered to the optical bench, the heater is activated thereby melting the solder, the mount is repositioned, and the heater is deactivated. Deactivation of the heater causes the solder to resolidify, thus recoupling the mount to the bench. In another aspect, a mounting tool is provided. The mounting tool grasps the mount with a pair of arms, the arms holding the mount without blocking access to the optical component. Preferably the two arms of the mounting tool are electrically isolated from one another and are designed to contact the pair of electrical connectors on the upright. In use the tool grasps the mount, applies sufficient voltage to the heater to melt the base plate mounting solder, positions the mount in the desired location, and deactivates the power source. After the solder has solidified, coupling the base to the mounting surface, the mounting tool can be released.

22 Claims, 5 Drawing Sheets

U.S. PATENT DOCUMENTS

| | | | |
|---|---|---|---|
| 5,268,066 | 12/1993 | Tabasky et al. | 216/17 |
| 5,307,434 | 4/1994 | Blonder et al. | 385/91 |
| 5,329,539 | 7/1994 | Pearson et al. | 372/36 |
| 5,412,683 | 5/1995 | Nighan, Jr. et al. | 372/101 |
| 5,513,070 * | 4/1996 | Xie et al. | 361/700 |
| 5,535,296 | 7/1996 | Uchida | 385/89 |
| 5,548,605 | 8/1996 | Benett et al. | 372/36 |
| 5,608,749 | 3/1997 | Kuzuki | 372/36 |
| 5,700,987 | 12/1997 | Basavanhally | 219/56.1 |

* cited by examiner

SOLDERABLE OPTICAL MOUNT

CROSS-REFERENCES TO RELATED APPLICATIONS

This application is a continuation-in-part of U.S. patent application Ser. No. 09/097,648, filed Jun. 16, 1998 now U.S. Pat. No. 6,172,997.

STATEMENT AS TO RIGHTS TO INVENTIONS MADE UNDER FEDERALLY SPONSORED RESEARCH AND DEVELOPMENT

This invention was made with Government support under Contract No. DAAB07-97-C-J017 awarded by the U.S. Department of Defense. The Government has certain rights in the invention.

FIELD OF THE INVENTION

The present invention relates generally to optical systems and, more particularly, to a method and apparatus for mounting various optical components to an optical bench.

BACKGROUND OF THE INVENTION

In designing a typical optical system, the various optical components must be aligned to each other with positional tolerances on the order of sub-micrometers. Conventional systems use adjustable mounts that allow the position of the optical component to be adjusted after the component has been mounted to the optical bench. Unfortunately, such optical mounts are typically quite large and, due to their mechanical complexity, relatively expensive. Furthermore, once the optical component has been correctly located, it is typically difficult to lock the component into place, thereby preventing undesired component movement.

A variety of systems have been designed to precision align and bond optical components. For example, U.S. Pat. No. 4,749,842 discloses a method of mounting the lasant material in a laser ring resonator. As disclosed, the lasant material is first mounted to a thermally conductive block using an optical adhesive. The conductive block is soldered to the face of a heater, the heater bonded to a thermally insulative support structure. In order to optically align the lasant material, the heater raises the temperature of the solder to its softening point, allowing the position of the lasant material to be changed prior to the resolidification of the solder. The heater also can be used to maintain the lasant material at an elevated temperature, thus allowing the output wavelength of the laser to be thermally tuned.

U.S. Pat. No. 4,944,569 discloses a method of sequentially aligning optical fibers in a multi-fiber optoelectronic package. As disclosed, each fiber is individually mounted within a fiber block, the fiber blocks being soldered to a carrier platform. During alignment, the temperature of the carrier is sufficiently raised to cause the solder to soften. Once softened, the first fiber block and its captured fiber are optically aligned. After the first fiber block is aligned, the solder underlying the aligned fiber block is cooled past its solidification point with a thermoelectric cooler mounted underneath the carrier. By positioning thermoelectric coolers under each fiber block mounting location, the solder underlying each fiber block may be individually solidified, thus allowing the fibers to be selectively coupled and uncoupled from the carrier platform.

U.S. Pat. No. 5,170,409 discloses a low cost resonator assembly that is relatively easy to align and assemble. The system utilizes UV transparent mirror mounts. Mirrors are bonded to the mounts and the mounts are bonded to a support plate using a UV curable adhesive. Until the adhesive is subjected to UV radiation it remains viscous, thus allowing the mirrors as well as the mirror mounts to be continually adjusted until they are properly aligned. Once aligned, UV radiation is directed through the support plate to bond the mirror mounts and through the mirror mounts to bond the mirrors in place.

U.S. Pat. No. 5,329,539 discloses a compact solid state laser system that includes a laser diode pump, a laser gain medium, and various optical components. The diode pump and the laser gain medium each have individually controllable thermoelectric coolers that can be used to align and thermally tune the components. The optical platform that supports these components as well as the remaining laser system optical components is made of a thermally conductive, electrically non-conductive material that exhibits low thermal expansion. The bottom surface of the platform includes a plurality of individually controllable resistive heaters, the heaters being positioned immediately below solder pads on the top surface of the platform. The optical components of the laser system are positioned on the individual solder pads. Through the independent activation of the heater pads, individual components may be optically aligned and then soldered into place.

Although a variety of optical mounts have been designed, primarily for use with miniature optical components, an optical mount that can be used to easily and semi-permanently mount an optical component to an optical bench is desired.

SUMMARY OF THE INVENTION

The present invention provides a method and apparatus for mounting components to an optical bench such that the components can be easily detached, realigned, and remounted. Components that can use the mount include, but are not limited to, mirrors, output couplers, windows, filters, lenses, optical fibers, nonlinear crystals, passive Q-switches, active Q-switches, piezoelectric elements, apertures, laser gain media, and detectors.

In one aspect of the invention, the optical component is mounted to an upright portion of the mount. The upright portion of the mount is preferably mounted to the base portion using solder although other coupling techniques can be used. The base portion includes a heater, such as a resistive heater, which can be used to solder the base plate to the optical bench. Alternately, the base plate can be bonded to the bench, the heater providing heat to cure the adhesive. Assuming the former approach, repositioning the mount is simply a matter of melting the solder with the base plate heater, repositioning the mount, and deactivating the heater. Deactivation of the heater causes the solder to solidify, thus re-coupling the mount to the bench.

In another aspect of the invention, both the base plate and the upright are fabricated from a ceramic material such as alumina. Due to the stiffness of such materials the mount has a high natural frequency, thus reducing the susceptibility of the mount to vibration. Additionally, if solder is used to couple the upright to the base and the base to the bench, the solder will quickly dampen any mount vibrations. Furthermore, due to the electrically insulating properties of the ceramic, the electrical connections to the heater are simplified. Lastly, the thermal properties of the ceramic base plate are used in the performance optimization of the heater.

In one embodiment of the invention, the upright is soldered to the base plate, the solder acting as part of the electrically conductive coupling between a pair of electrical connectors mounted on the upright and a pair of conductive pads attached to the resistive heater. The electrical connectors on the upright provide an easy means of applying a voltage to the resistive heater. Preferably the solder coupling the upright to the base plate has a higher melting point than the solder coupling the base plate to the optical bench. This allows the mount assembly to be completed prior to locating and soldering the mount to the bench. Additionally, the different melt temperatures allow the mount to be repositioned without causing the decoupling of the upright/base plate union.

In another aspect of the invention, a mounting tool is provided. The mounting tool grasps the mount with a pair of arms, the arms designed to hold the mount without blocking access to the optical component. Preferably the two arms of the mounting tool are electrically isolated from one another and are designed to contact the pair of electrical connectors on the upright. In use, the tool grasps the mount, applies sufficient voltage to the heater to melt the base plate mounting solder, positions the mount in the desired location, and deactivates the power source. After the solder has solidified thereby coupling the base to the mounting surface, the mounting tool can be released.

A further understanding of the nature and advantages of the present invention may be realized by reference to the remaining portions of the specification and the drawings.

DESCRIPTION OF THE SPECIFIC EMBODIMENTS

Figure 1:
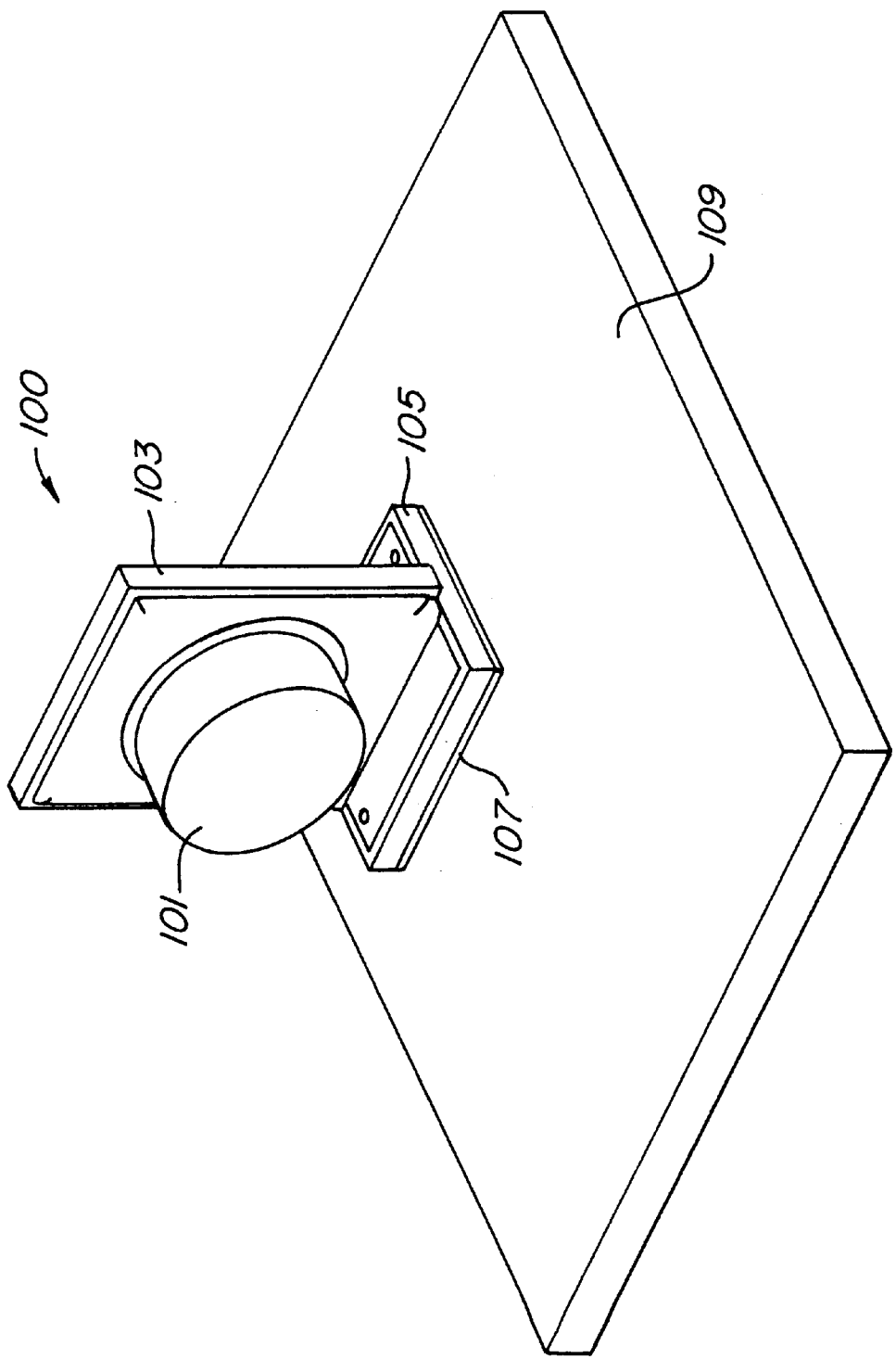
FIG. 1 is a perspective view of an optical mount in accordance with the present invention.

FIG. 1 is a perspective view of an optical mount 100 in accordance with the present invention. An optical component 101 is attached to an upright portion 103 of mount 100. As with a standard optical mount, mount 100 may be used with a variety of different optical component types ranging from simple optical elements to more complex electro-optical devices. For example, component 101 may be a reflective element (e.g., a mirror), a transmissive element (e.g., an output coupler, a window, an optical fiber, a lens, a filter, etc.), a nonlinear crystal, an active or passive Q-switch, a piezoelectric element, a detector, an aperture, or some other component/assembly. Depending upon the type of optical component, the face of upright 103 may either be solid (e.g., for use with a total reflector) or include one or more apertures (e.g., for use with a transmissive optic).

Upright 103 is coupled to a base plate 105. Although upright 103 is preferably soldered to base plate 105, other coupling means may be used such as an adhesive or one or more mechanical couplers (e.g., screws, bolts, etc.). Alternately, upright 103 and base plate 105 may be fabricated as a single, integral component (e.g., integral ceramic T).

Coupled to base plate 105 is a heater 107, preferably a resistive heater. Heater 107 is used during the coupling process between base plate 105 and an optical bench 109. In the preferred embodiment of the invention, base plate 105 is soldered to a metallized surface of bench 109, the metallization improving the adherence qualities of the solder. Heater 107 is used to melt the solder. Alternately, base plate 105 may be bonded to bench 109, heater 107 providing heat to cure the adhesive. The disadvantage of the latter embodiment is that the bond must be broken in order to move mount 100, typically requiring that the bonding surfaces of both base plate 105 and bench 109 be cleaned and reconditioned prior to subsequent use. In contrast, in the preferred embodiment base plate 105 may be separated from bench 109 by simply melting the solder with heater 107. Mount 100 can then be repositioned and resoldered to a new location, either on bench 109 or on some other surface. Typically the only reconditioning that may be required prior to resoldering mount 100 to a new location is to add more solder to one or both of the solder surfaces.

In the preferred embodiment of the invention base plate 105 and upright 103 are fabricated from an insulating material, preferably a machinable ceramic such as alumina. Very stiff materials such as alumina reduce the susceptibility of mount 100 to vibration as the alumina structure provides a high natural frequency. In addition, if solder is used to couple upright 103 to base 105 and to couple base 105 to bench 109, the solder tends to quickly dampen any mount vibrations.

The use of an insulating material for upright 103 and base plate 105 offers several advantages besides that noted above. First, if base plate 105 were not made of an insulating material, an electrically insulating layer would have to be added to the structure to separate heater 107 from plate 105, assuming an electrical heater such as a resistive heater. Second, as the thermal conductivity of plate 105 increases, more and more of the heat produced by heater 107 flows into optical mount 100 as opposed to flowing primarily into the solder interface. As the heat flowing into mount 100 increases, so does the amount of heat that must be produced by heater 107 in order to achieve the melt temperature of the solder. Therefore a base plate 105 with a relatively low thermal conductivity limits the heat production required of heater 107. Third, an electrically insulative upright 103 and base plate 105 simplify the design of the heater connectors as disclosed in more detail below.

Figure 2:
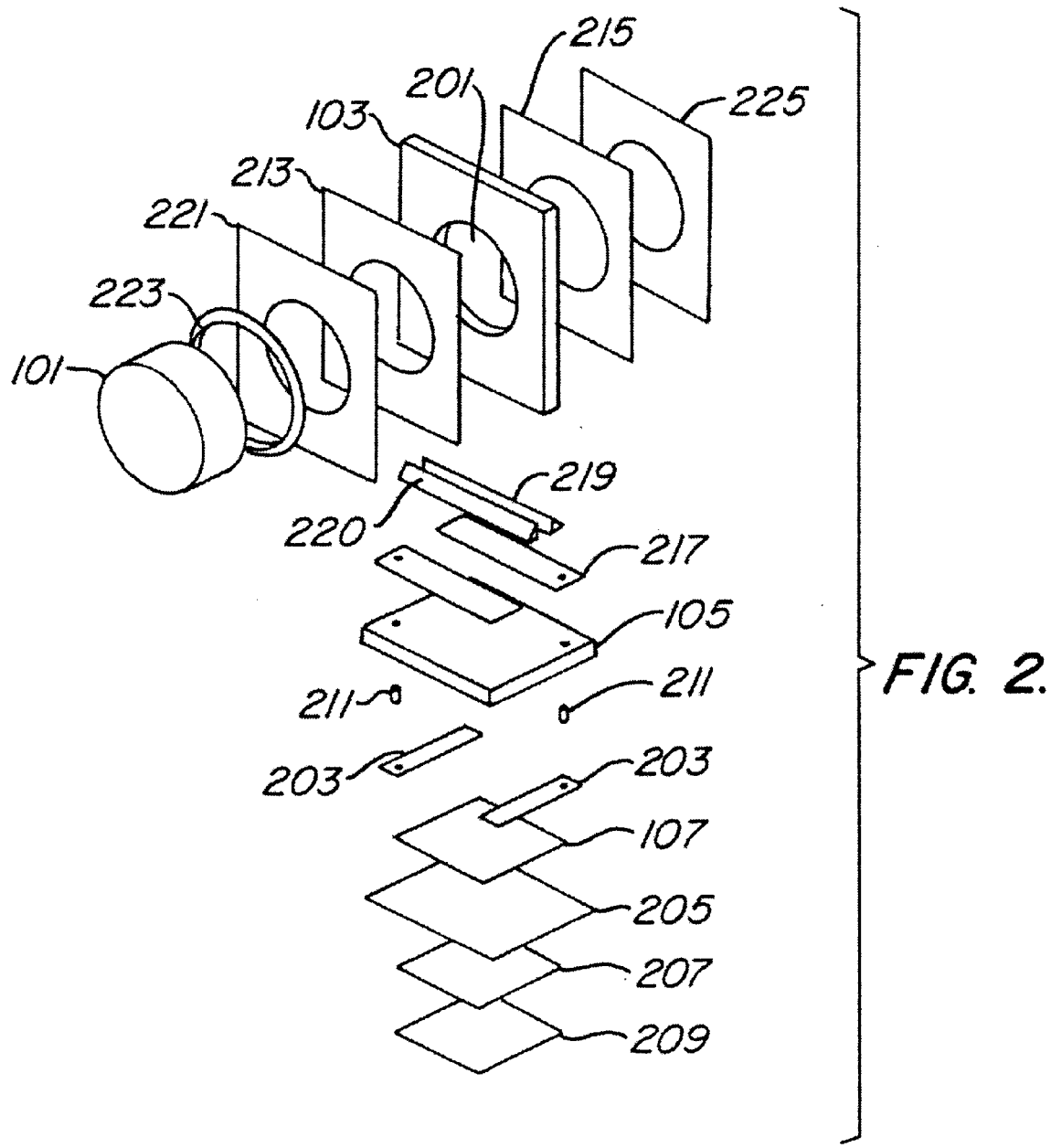
FIG. 2 illustrates the individual elements of the preferred embodiment of the invention.

FIG. 2 illustrates the individual elements of the preferred embodiment of the invention. Although mount 100 is shown with an aperture 201 suitable for use with a transmissive element, upright 103 may also be a solid upright or a multi-aperture upright as noted above.

In this embodiment of the invention, heater 107 is a resistive layer, preferably with a resistance of approximately 40 ohms to aid power conditioning. A voltage is applied to heater 107 through a pair of electrical contact pads 203. In this embodiment of the invention, pads 203 are metallized regions on the bottom surface of base plate 105, typically with a thickness on the order of 10 micrometers or more. Resistive layer 107 is applied on top of, and in contact with contact pads may be applied to the opposite side of heater layer 107.

A passivating dielectric layer 205 is applied over resistive layer 107, thereby preventing layer 107 from shorting. In this embodiment of the invention, a metallized pad 207 is applied to layer 205, layer 207 providing a superior bonding surface for the solder. Preferably layer 207 is comprised of a platinum-gold alloy approximately 6 to 12 micrometers thick although pads of different thickness and material content may be used, depending upon the selected solder. For example, layer 207 may be comprised of non-metallic materials. In the illustrated embodiment a solder layer 209 is used to join base plate 105 to bench 109 (not shown in this figure). A suitable solder is Indalloy 8 (i.e., 44 weight percent indium, 42 weight percent tin, and 14 weight percent cadmium) with a melting temperature of 93° C., commercially available from Indium Corporation of America. Prior to joining plate 105 to another surface, solder layer 209 is attached to layer 207, to the mating surface on the bench, or to both.

Passing through base plate 105 is a pair of electrically conductive feed throughs 211 that are coupled to pads 203, thus providing electrical access to heater 107. Although the power source may be directly connected to feed throughs 211 at the upper surface of base plate 105, preferably pads 203 are electrically coupled to a pair of coupling surfaces 213 and 215 on upright 103. Surfaces 213 and 215 may be easily connected to the power source with a simple tool as described in more detail below.

Metallized surfaces 213 and 215 can be applied to upright 103 using any of a variety of well known techniques, including screen printing, vapor deposition, and metal foil bonding, and are preferably at least 10 micrometers thick. Conductive paths are provided between surfaces 213/215 and base plate feed throughs 211 via a pair of metallized pads 217 on the upper surface of base plate 105 and a pair of solder fillets 219/220. Besides providing a means of electrically coupling to feed throughs 211 and thus heater layer 107, the combination of metallized pads 217, solder fillets 219/220, and surfaces 213/215 also mechanically couples upright 103 to base plate 105 as previously noted. Preferably solder fillets 219/220 are comprised of an indium alloy with a melting temperature of approximately 221° C. such as Indalloy 121 (i.e., 96.5 weight percent tin and 3.5 weight percent silver), commercially available from Indium Corporation of America. In an alternate embodiment, fillets 219/220 may be comprised of an electrically conductive adhesive.

Although optic 101 can be directly bonded to layer 213, in the preferred embodiment a layer of solder 221 is first applied to layer 213. Solder layer 221 need not be substantially equivalent in size to layer 213 as shown. Instead it can be designed to only cover the area of layer 213 underlying optic 101 as well as the area of layer 213 to be coupled to solder fillet 220. In one embodiment of the invention, solder layer 221 is formed of a high temperature indium alloy with a melting temperature of approximately 221° C. such as Indalloy 121. In this embodiment optic 101 is bonded to layer 221 with an optical adhesive 223, such as high temperature epoxy EPO-TEK 353-ND commercially available from Epoxy Technology, Inc.

Solder layer 221 provides both stress relief to component 101 and optical alignment over a wide temperature range (i.e., −8° C. to 175° C.). The use of a stress relieving layer allows a variety of different optical materials exhibiting a wide range of strengths and thermal expansion coefficients to be mounted to upright 103. If solder or a similar stress relieving layer is not used between component 101 and upright 105, the mismatch between the thermal expansion coefficients can be great enough to fracture component 101.

As illustrated, a layer of solder 225 is also applied to surface 215. Solder layer 225 is not required for its stress relieving qualities unless an optical element is attached to that side of upright 103. Solder layer 225 does, however, assist the process of soldering metallized surface 215 to metallized pad 217 with solder fillet 219. In this instance solder layer 225 does not need to entirely cover layer 215. Rather, layer 225 may be limited to the area of surface 215 that is in direct contact with solder fillet 219.

In the preferred embodiment of the invention illustrated in FIG. 2, the solder attaching upright 103 to base plate 105 and underlying component 101 has a higher melting point than the solder used to couple mount 100 to the optical bench. For example, in the illustrated embodiment the melting temperature for the former solder is approximately 221° C. while the melting temperature of the latter solder is approximately 93° C. The benefit of using different melt temperature solders is that the assembly of mount 100 may be completed prior to coupling mount 100 to bench 109. Besides making the assembly process easier, this sequential soldering approach also allows mount 100 to be held by upright 103 during the base to bench coupling procedure.

Figure 3:
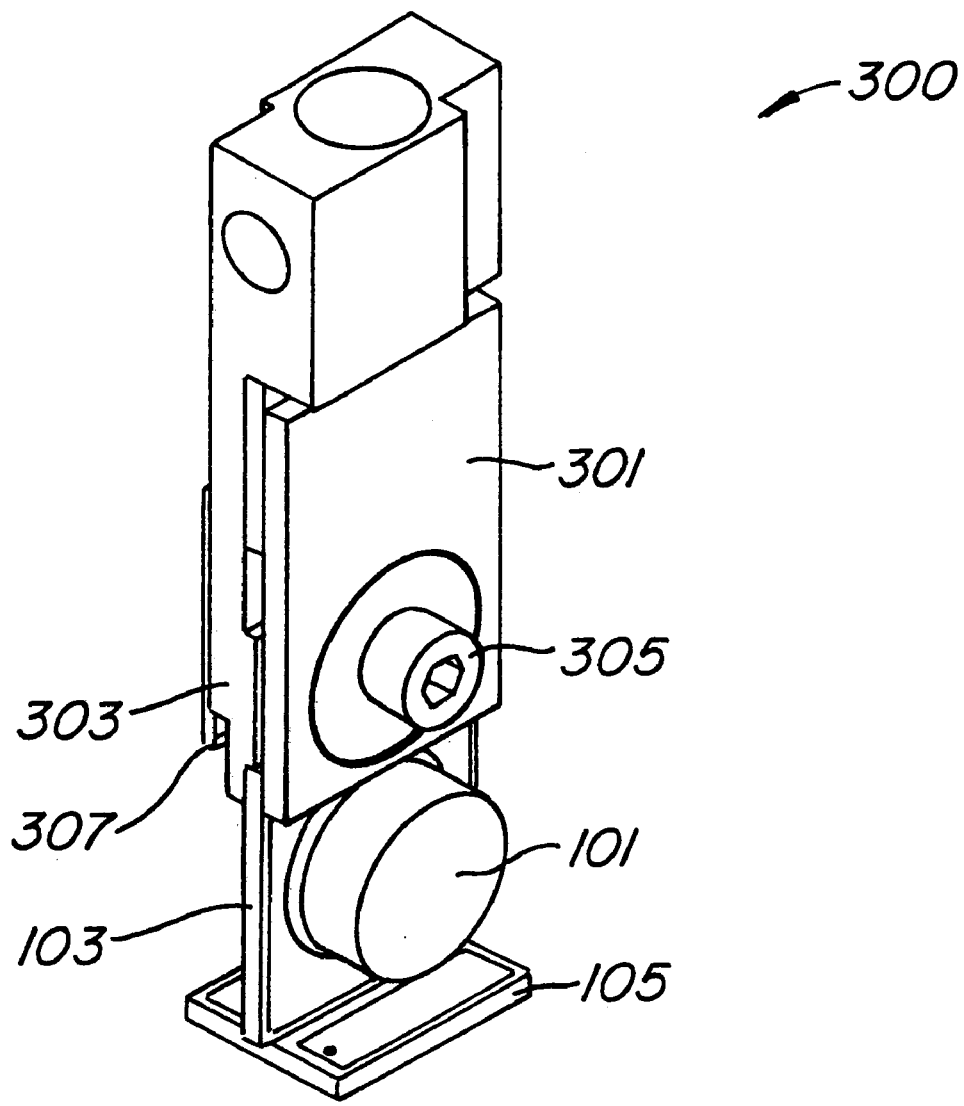
FIG. 3 is an illustration of the preferred embodiment of a mounting tool that is used to position and align the optical mount of the present invention.

FIG. 3 is an illustration of the preferred embodiment of a mounting tool 300 that is used to position and align the optical mount of the present invention. Tool 300 includes a first arm 301 and a second arm 303 that are designed to clamp onto upright 103 of mount 100, thus allowing mount 100 to be easily aligned. Although tool 300 can be used to manually align mount 100, preferably tool 300 is detachably coupled to a robotic handling system as illustrated in FIG. 4.

Figure 4:
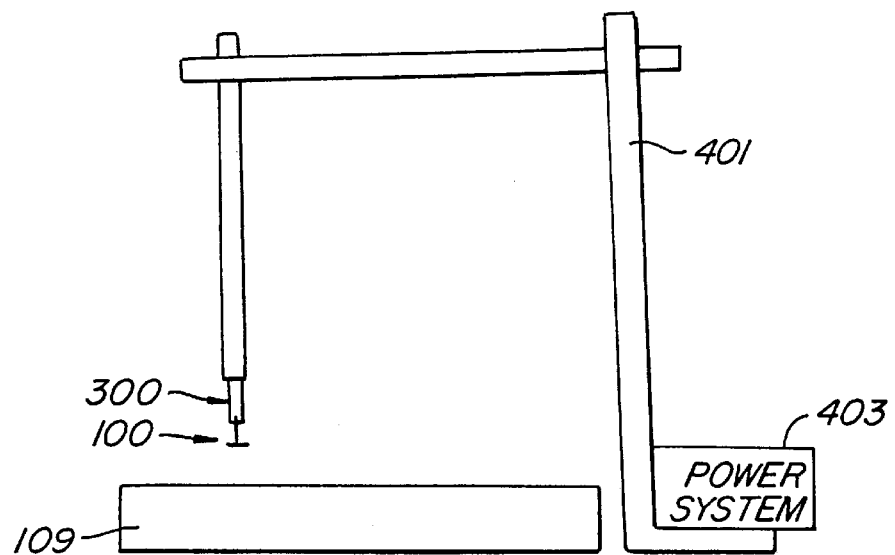
FIG. 4 is an illustration of a robotic handling system for use with the mounting tool shown in FIG. 3.
Figure 5:
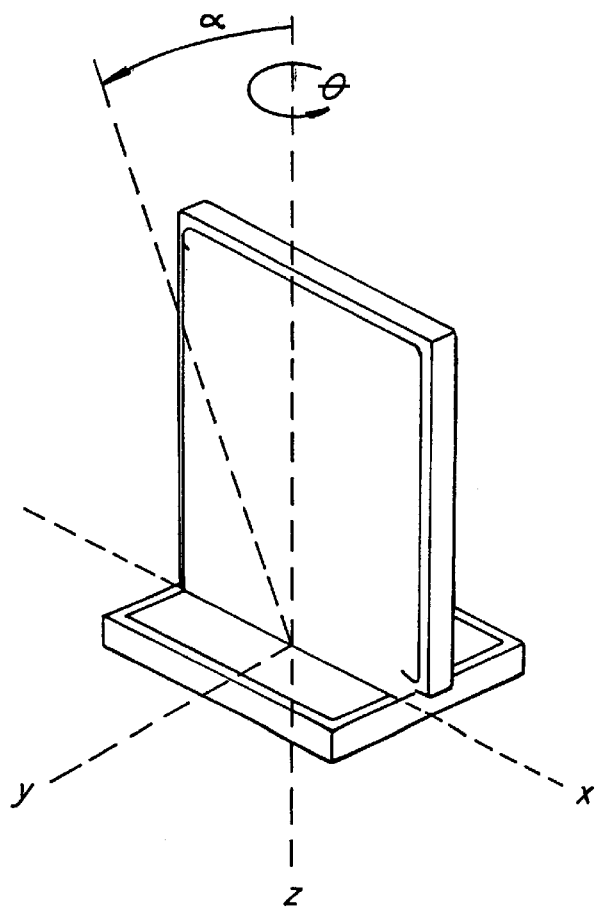
FIG. 5 illustrates the degrees of motion for the robotic handling system shown in FIG. 4.

In FIG. 4, a robotic handling system 401 is used to position mount 100 on bench 109. Preferably robotic system 401 provides translational movement along all three orthogonal axes, x, y, and z, as well as rotational movement, θ, and tilt, α, as illustrated in FIG. 5. Depending upon the application, only a subset of these five motions may be required. For example, the mass assembly of a relatively insensitive optical system will typically require fewer degrees of freedom than the automated optimization of the cavity mirrors for an optical resonator. A power supply 403 is coupled to heater 107 through mounting tool 300.

In mounting tool 300 illustrated in FIG. 3, the compression of arms 301 and 303 in order to hold upright 103 is accomplished through the use of at least one manually rotated, tensioning bolt 305. Alternately, the tension may be applied through the use of one or more tensioning springs, clips, or other well known holding means. Furthermore, the tensioning means may either be manual, as shown, or automated.

In another aspect of mounting tool 300, arms 301 and 303 are electrically isolated from one another. As tool 300 grasps upright 103, arms 301 and 303 electrically couple to conductors 213 and 215 and thus to pads 203 connected to resistive heater 107. Therefore voltage can be applied to heater 107 through mounting tool 300. Accordingly, in use tool 300 grasps mount 100, applies sufficient voltage to heater 107 to melt solder 209, positions mount 100 in the desired location, and discontinues the application of power, thereby allowing solder 209 to cool and solidify. Once solder 209 solidifies, tool 300 releases mount 100 which has been firmly bonded into place. Using this approach, mount 100 can be soldered to the surface of optical bench 109 at any location defined by the coordinates x, y, and θ. In addition, due to the thickness of solder 209, the z and α coordinates of mount 100 can also be controlled.

In another aspect of mounting tool 300, a temperature sensor 307 can be mounted on tool 300 and used to monitor the temperature of heater 107, thereby allowing active temperature control. Active temperature control is used to insure that mount 100 is not overheated during the heating procedure. The thermal path between heater 107 and temperature sensor 307 is provided, at least in part, by the thermal conductivity of the solder and the metallized components leading from tool 300 to resistive heater 107. The thermal conductivity of base plate 105 and upright portion 103 also contributes to this thermal path.

In an alternate embodiment of the invention, mounting tool 300 is heated, for example with resistive heaters, and the heat is thermally conducted from tool 300 to base plate 105 where it is used to liquefy solder pad 209 or cure a similarly situated adhesive pad. In this embodiment mount 100 does not necessarily require resistive heating layer 107. In this embodiment base plate 105 and upright portion 103 are preferably comprised of a material exhibiting a relatively high thermal conductivity. In addition, preferably optic 101 is coupled to upright portion 103 and upright portion 103 is coupled to base plate 105 in such a way that the heating of mount 100 does not jeopardize either joint.

Figure 6:
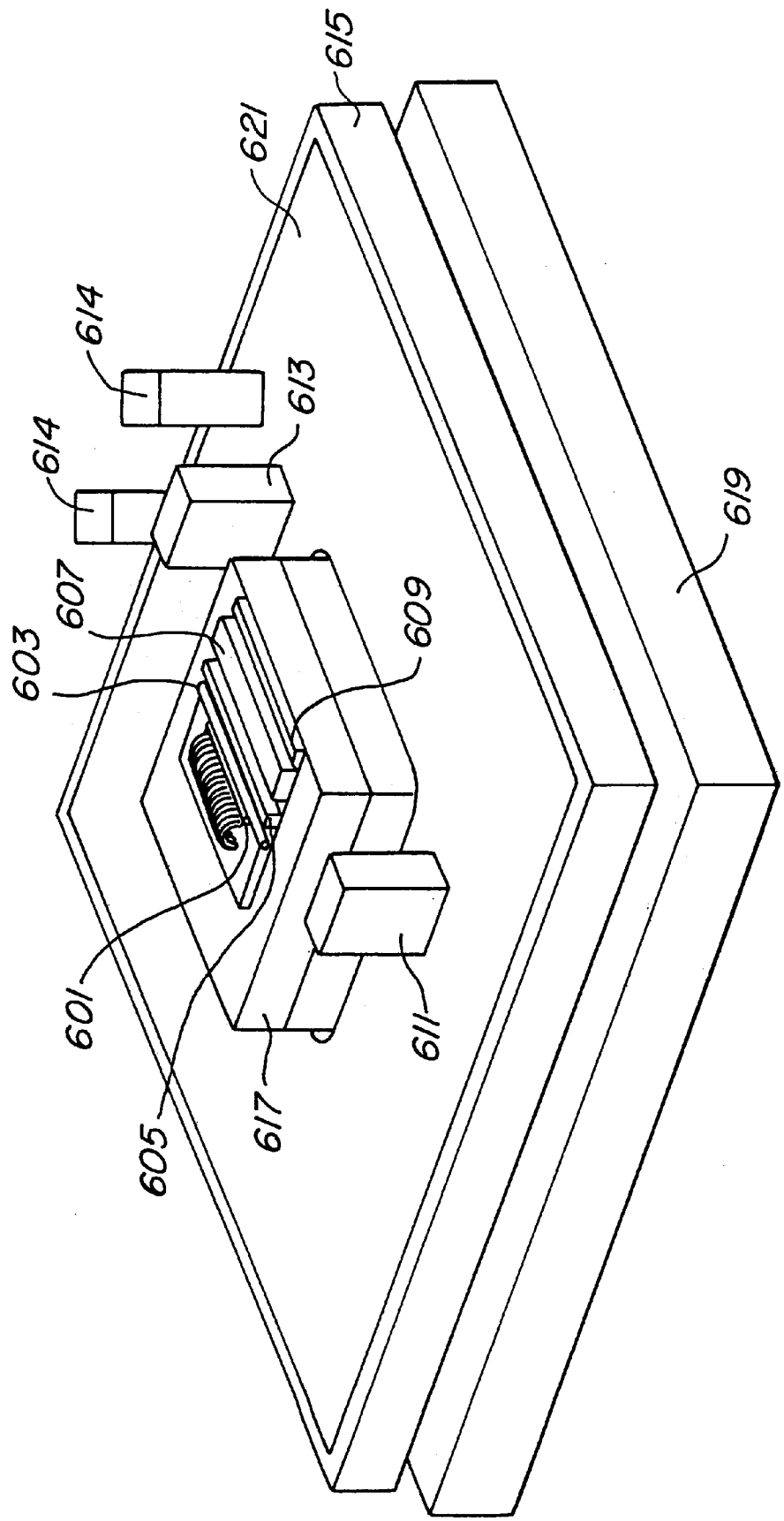
FIG. 6 provides a perspective view of a laser system using a side pumped gain module with the resonator optics attached to a separate, thermally isolated platform utilizing the mirror mounts of the present invention.

FIG. 6 illustrates the use of the present invention in a particular system, i.e., a single side pumped laser assembly in accordance with co-pending U.S. patent application Ser. No. 09/097,648, filed Jun.16, 1998, the disclosure of which is incorporated herein for all purposes. The laser system includes a pump diode 601, a coupling lens 603, a waveplate 605, and a laser gain media 607 all bonded to a monolithic substrate 609 that includes registration structures to provide easy component alignment. In the illustrated embodiment the resonator optics, including mirror 611 and output coupler 613, as well as turning mirrors 614, are mounted to a miniature optical bench 615 using the mounting system of the present invention. As shown, bench 615 is thermally isolated from substrate 609, thus providing better optical stability in the resonator cavity. Substrate 609 is attached to a heat spreader 617 that helps to prevent hot spots near laser diode 601 and laser gain media 607. Heat spreader 617 may be attached to a heat sink 619. Suitable approaches for heat sinking the thermal load developed by the gain module include passive cooling (e.g., thermal mass), active cooling (e.g., fins and forced air convection, liquid coolant, etc.), and thermal transfer (e.g., heat pipe coupled to a thermal electric cooler or a cold plate, etc.). If desired, a thin film of a thermally conductive material (e.g., diamond film, copper film, etc.) can be applied between substrate 609 and heat spreader 617, thus further inhibiting the development of hot spots in substrate 609. Heat spreader 617 projects through a cutout in a miniature optical bench 615.

Optical bench 615 is preferably fabricated from a material that has a very low coefficient of thermal expansion, thereby making the resonator cavity formed by optics 611 and 613 relatively insensitive to thermal variations. For example, bench 615 may be fabricated from Zerodur. Preferably the surface of bench 615 is metallized, for example with a layer of gold 621. Optics 611, 613, and 614 are coupled to solderable optical mounts 100, the solderable optical mounts being soldered to metallized surface 621 of optical bench 615.

The present invention is not limited to the embodiment illustrated above. Rather, the invention can be used to mount a variety of different types of optical and electro-optical components to optical benches of varying size and type. Utilizing the invention numerous different resonator designs and optical systems and subsystems may be fabricated.

As will be understood by those familiar with the art, the present invention may be embodied in other specific forms without departing from the spirit or essential characteristics thereof. Accordingly, disclosure of the preferred embodiment of the invention is intended to be illustrative, but not limiting, of the scope of the invention as set forth in the following claims.

What is claimed is:

1. An optical mount, comprising:
a base portion;
an upright portion coupled to a first face of said base portion;
a heater element coupled to a second face of said base portion;
at least two electrically conductive feed throughs, said feed throughs passing from said first face of said base portion to said second face of said base portion, wherein said feed throughs are coupled to said heater element;
a solder joint, said solder joint coupling said upright portion to said base portion, said solder joint comprising:
a first solder fillet coupling a first side of said upright portion to said first face of said base portion; and
a second solder fillet coupling a second side of said upright portion to said first face of said base portion, wherein said first solder fillet is electrically isolated from said second solder fillet;
a first region of metallization on said first side of said upright, said first region of metallization electrically coupled to said first solder fillet; and
a second region of metallization on said second side of said upright, said second region of metallization electrically coupled to said second solder fillet; and
a first metallized pad and a second metallized pad, wherein said first and second metallized pads are interposed between said second face of said base portion and said heater element, wherein said first and second metallized pads are electrically coupled to said heater element, and wherein said at least two electrically conductive feed throughs are comprised of at least a first electrically conductive feed through and a second electrically conductive feed through, wherein said first feed through is coupled to said first metallized pad and coupled to said first solder fillet, and wherein said second feed through is coupled to said second metallized pad and coupled to said second solder fillet, wherein said heater element is electrically coupled to said first region of metallization on said first side of said upright and to said second region of metallization on said second side of said upright.

2. An optical mount, comprising:
a base portion;
an upright portion coupled to a first face of said base portion;
a heater element coupled to a second face of said base portion; and
a solder joint, said solder joint coupling said upright portion to said base portion, said solder joint comprised of a first solder fillet coupling a first side of said upright portion to said first face of said base portion and a second solder fillet coupling a second side of said upright portion to said first face of said base portion, wherein said first solder fillet is electrically isolated from said second solder fillet, and wherein said first side of said upright portion is different from said second side of said upright portion.

3. The optical mount of claim 2, further comprising:

a first metallized pad and a second metallized pad, wherein said first and second metallized pads are interposed between said second face of said base portion and said heater element, wherein said first and second metallized pads are electrically coupled to said heater element; and at least two electrically conductive feed throughs, said feed throughs passing from said first face of said base portion to said second face of said base portion, wherein said feed throughs are coupled to said heater element, wherein said at least two electrically conductive feed throughs are comprised of at least a first electrically conductive feed through and a second electrically conductive feed through, wherein said first feed through is coupled to said first metallized pad and coupled to said first solder fillet, and wherein said second feed through is coupled to said second metallized pad and coupled to said second solder fillet.

4. The optical mount of claim 2, further comprising:

a first region of metallization on said first side of said upright portion, said first region of metallization electrically coupled to said first solder fillet; and a second region of metallization on said second side of said upright portion, said second region of metallization electrically coupled to said second solder fillet.

5. The optical mount of claim 4, further comprising:

a first metallized pad and a second metallized pad, wherein said first and second metallized pads are interposed between said second face of said base portion and said heater element, wherein said first and second metallized pads are electrically coupled to said heater element; and at least two electrically conductive feed throughs, said feed throughs passing from said first face of said base portion to said second face of said base portion, wherein said feed throughs are coupled to said heater element, wherein said at least two electrically conductive feed throughs are comprised of at least a first electrically conductive feed through and a second electrically conductive feed through, wherein said first feed through is coupled to said first metallized pad and coupled to said first solder fillet, and wherein said second feed through is coupled to said second metallized pad and coupled to said second solder fillet, wherein said heater element is electrically coupled to said first region of metallization on said first side of said upright portion and to said second region of metallization on said second side of said upright portion.

6. An optical mount, comprising:

a base portion;

an upright portion coupled to first face of said base portion;

a heater element coupled to a second face of said base portion;

at least two electrically conductive feed throughs, said feed throughs passing from said first face of said base portion to said second face of said base portion, wherein said feed throughs are coupled to said heater element; and an optical element bonded to at least one surface of said upright portion, wherein said optical element is selected from the group consisting of mirrors, output couplers, windows, filters, lenses, optical fibers, non-linear crystals, active Q-switches, passive Q-switches, laser gain media, piezoelectric elements, optical apertures, and detectors.

7. An optical mount, comprising:

a base portion coupleable to an optical bench;

a volume of solder, wherein at least a portion of said volume of solder is used to couple a first face of said base-portion to said optical bench;

an upright portion coupled to a second face of said base portion; and a heater element interposed between said portion of said volume of solder and said first face of said base portion, wherein said heater element has at least a first operating state and a second operating state, wherein said heater element operating in said first operating state provides sufficient heat to melt said portion of said volume of solder.

8. The optical mount of claim 7, wherein said heater element operates in a range of operating states between said first operating state and said second operating state.

9. The optical mount of claim 7, further comprising at least two electrically conductive feed throughs, said feed throughs passing from said second face of said base portion to said first face of said base portion, wherein said feed throughs are electrically coupled to said heater element.

10. The optical mount of claim 9, further comprising a pair of metallized pads interposed between said first face of said base portion and said heater element, wherein said metallized pads are electrically coupled to said heater element and to said at least two electrically conductive feed throughs.

11. The optical mount of claim 7, further comprising a passivating dielectric layer interposed between said heater element and said portion of said volume of solder.

12. The optical mount of claim 11, further comprising a metallized pad interposed between said passivating dielectric layer and said portion of said volume of solder.

13. A mounting tool and an optical mount system, wherein the mounting tool is detachably coupleable to the optical mount, the optical mount comprising:

a base portion;

an upright portion coupled to a first face of said base portion;

a heater element coupled to a second face of said portion;

a solder joint, said solder joint coupling said upright portion to said base portion, said solder joint further comprising a first solder fillet coupling a first side of said upright portion to said first face of said base portion and a second solder fillet coupling a second side of said upright portion to said first face of said base portion, wherein said first solder fillet is electrically isolated from said second solder fillet;

a first region of metallization on said first side of said upright portion, said first region of metallization electrically coupled to said first solder fillet;

a second region of metallization on said second side of said upright portion, said second region of metallization electrically coupled to said second solder fillet;

a first metallized pad and a second metallized pad, wherein said first and second metallized pads are interposed between said second face of said base portion and said heater element, wherein said first and second metallized pads are electrically coupled to said heater element;

a first electrically conductive feed through and a second electrically conductive feed through, said first and second feed throughs passing from said first face of said base portion to said second face of said base portion, wherein said first feed through is coupled to said first metallized pad and coupled to said first solder fillet, and wherein said feed through is coupled to said second metallized pad and coupled to said second solder fillet, wherein said heater element is electrically coupled to said first region of metallization on said first side of said upright portion and to said second region of metallization on said second side of said upright portion; and wherein said mounting tool in a first position holds said upright portion of said optical mount, wherein a first arm of said mounting tool electrically couples to said first metallization region on said first side of said upright portion and a second arm of said mounting tool electrically couples to said second metallization region on said second side of said upright portion.

14. The mounting tool and optical mount system of claim 13, further comprising a voltage source coupled to said first arm and said second arm, wherein activation of said voltage source activates said heater element.

15. The mounting tool and optical mount system of claim 13, further comprising a robotic handling system coupled to said mounting tool.

16. A method of attaching an optical mount to a surface, comprising the steps of:

coupling a voltage source to a first metallized region on a first side and a second metallized region on a second side of an upright portion of said optical mount, wherein said first metallized region is coupled to a first solder fillet, said first solder fillet joining said first side of said upright portion to a top surface of a base portion of said optical mount, wherein said second metallized region is coupled to a second solder fillet, said second solder fillet joining said second side of said upright portion to said top surface of said base portion, wherein said first metallized region is electrically coupled to a first portion of a heater via said first solder fillet and a first conductive feed through, and wherein said second metallized region is electrically coupled to a second portion of said heater via said second solder fillet and a second conductive feed through, said heater attached to a bottom surface of said base portion;

activating said voltage source, wherein activation of said voltage source causes said heater to liquefy a solder pad;

positioning said optical mount in a desired location on said surface; and deactivating said voltage source, wherein said solder pad solidifies, said solidified solder pad attaching said optical mount to said surface.

17. The method of claim 16, further comprising the step of grasping said upright portion of said optical mount with a mounting tool, wherein a first arm of said mounting tool electrically couples to said first metallized region and a second arm of said mounting tool electrically couples to said second metallized region, wherein said voltage source is coupled to said first and second metallized regions through said first and second arms of said mounting tool.

18. The method of claim 17, wherein said positioning step is performed with a robotic translation system, said robotic translation system coupled to said mounting tool.

19. The method of claim 18, wherein said robotic translation system controls said optical mount position along an x-axis, along a y-axis, and along a z-axis.

20. The method of claim 18, wherein said robotic translation system controls said optical mount position along a rotational axis and along a tilt axis.

21. A method of attaching an optical mount to a surface, comprising the steps of:

coupling a voltage source to a first metallized region on a first side and a second metallized region on a second side of an upright portion of said optical mount, wherein said first metallized region is coupled to a first solder fillet, said first solder fillet joining said first side of said upright portion to a top surface of a base portion of said optical mount, wherein said second metallized region is coupled to a second solder fillet, said second solder fillet joining said second side of said upright portion to said top surface of said base portion, wherein said first metallized region is electrically coupled to a first portion of a heater via said first solder fillet and a first conductive feed through, and wherein said second metallized region is electrically coupled to a second portion of said heater via said second solder fillet and a second conductive feed through, said heater attached to a bottom surface of said base portion;

activating said voltage source, wherein activation of said voltage source causes said heater to cure an adhesive pad;

positioning said optical mount in a desired location on said surface; and deactivating said voltage source.

22. A method of attaching an optical mount to a surface, comprising the steps of:

coupling a voltage source to a first metallized region on a first side and a second metallized region on a second side of an upright portion of said optical mount, wherein said first metallized region is coupled to a first electrically conductive bond joint, said first electrically conductive bond joint joining said first side of said upright portion to a top surface of a base portion of said optical mount, wherein said second metallized region is coupled to a second electrically conductive bond joint, said second electrically conductive bond joint joining said second side of said upright portion to said top surface of said base portion, wherein said first metallized region is electrically coupled to a first portion of a heater via said first bond joint and a first conductive feed through, and wherein said second metallized region is electrically coupled to a second portion of said heater via said second bond joint and a second conductive feed through, said heater attached to a bottom surface of said base portion;

activating said voltage source, wherein activation of said voltage source causes said heater to liquefy a solder pad;

positioning said optical mount in a desired location on said surface; and deactivating said voltage source, wherein said solder pad solidifies, said solidified solder pad attaching said optical mount to said surface.

* * * * *